Patented Oct. 26, 1954

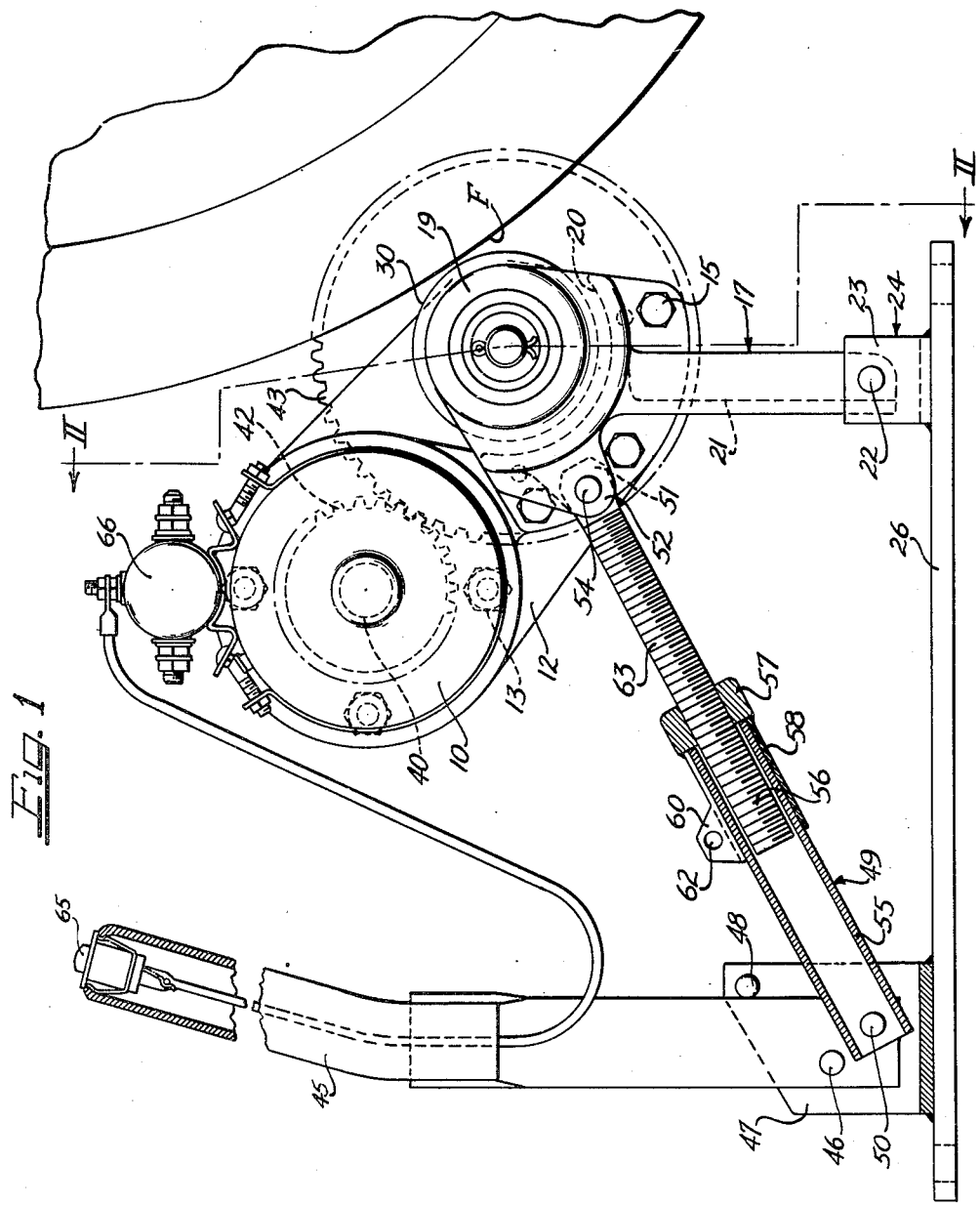
INVENTORS
THOMAS W. ASHCROFT
FRANKLIN G. HOBART
BY Paul L. Kuchar
ATTY.

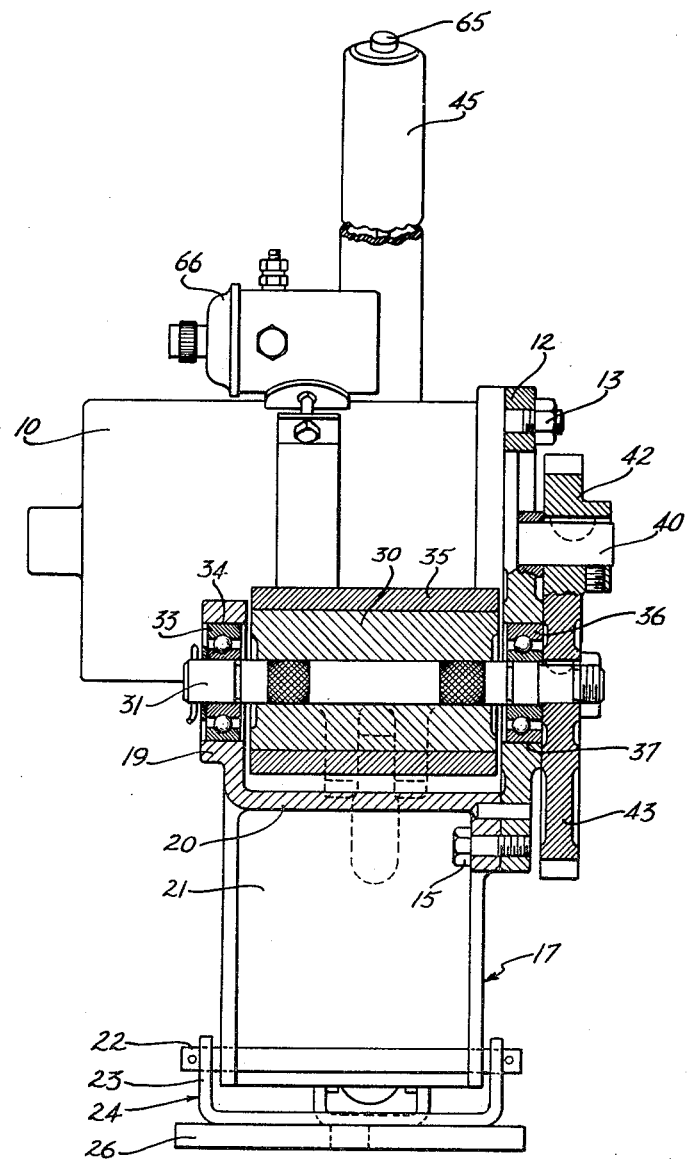

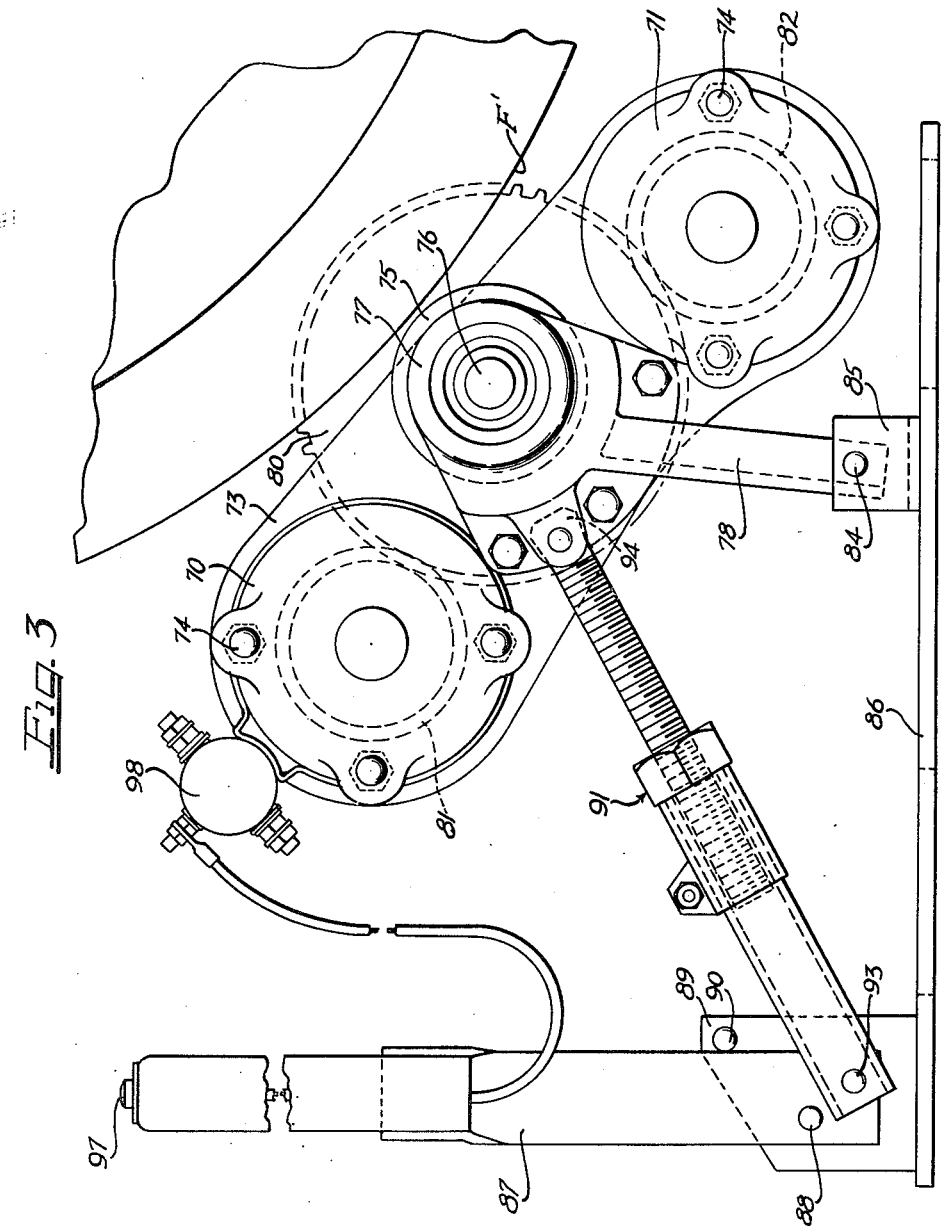

2,692,505

UNITED STATES PATENT OFFICE 2,692,505

STARTER MECHANISM FOR INTERNAL-COMBUSTION ENGINES

Thomas W. Ashcroft and Franklin G. Hobart, Beloit, Wis., assignors to Fairbanks, Morse & Co., Chicago, Ill., a corporation of Illinois Application April 26, 1952, Serial No. 284,536

7 Claims. (Cl. 74—8)

This invention relates to improvements in starter mechanism for internal combustion engines. More particularly it has to do with a friction drive engageable with the flywheel of an internal combustion engine for starting the same from a source of power such as an electric motor.

Heretofore friction drive starters have been provided wherein a power driven friction roller is arranged to be moved into contact with the peripheral surface of the flywheel of an engine to effect the turning over of the engine during starting. For the most part the prior art friction starters have used a belt drive between the power unit and friction roller. Such belt drive starters have proven unsatisfactory for many applications, since the belt must be adequately tensioned at the instant the friction roller contacts the flywheel. If the belt is not tensioned, it will slip when the load is applied.

It is therefore an important object of the present invention to provide a friction starter for an engine which is capable of driving the flywheel at all engaged positions of the friction roller and the engine flywheel.

Another object of this invention is to provide an engine starter having a gear drive between the prime mover and the friction cylinder, the motor and the roller being disposed in a unitary structure and adapted for pivotal movement as a unit toward and away from the engine flywheel.

A still further object of this invention is to provide an engine starter wherein the operating parts, including the prime mover and the friction roller, are so arranged and mounted on a base that the unit will assume a normal disengaged position relative to the engine flywheel but will be so counterbalanced that a minimum amount of power is required to move the friction roller against the engine flywheel.

According to the general features of this invention a cylindrical roller, having a surface of a friction material, is rotatably mounted on a support plate which in turn is pivotally mounted on a rigid base. The roller is driven through gears from an electric motor which is also mounted on the starter plate, forming a unitary pivotal assembly with the roller. A manually operated lever system is adapted to pivot the unitary assembly toward or away from the engine flywheel. The lever system includes an adjustable linkage through which the friction roller can be adjusted relative to the engine flywheel. It will be appreciated that the present assembly provides a compact, efficient unit wherein the geared drive from the motor to the friction roller eliminates the possibility of the roller failing to transmit power to the engine flywheel.

Other and further features, objects, and advantages of the present invention will be apparent to one skilled in the art from the following detailed description taken in connection with the accompanying drawings.

On the drawings:

Figure 1 is a side elevational view, with parts broken away and parts in section, of an engine starter constructed according to the teachings of the present invention.

Figure 2 is a vertical sectional view taken on line 2—2 of Figure 1.

Figure 3 is a side elevational view of a modified form of the friction starter of the present invention featuring a friction roller drive using two electric motors.

As shown on the drawings:

In Figures 1 and 2 the reference numeral 10 indicates an electric motor that is rigidly secured to a support plate 12 by a plurality of bolts 13. The plate 12 is disposed in a generally upright position and is secured by cap screws 15 to a pivotal support bracket 17. This bracket comprises an end flange 19 which projects upwardly, substantially normal to a segmental cylindrical cradle-like portion 20. A flat plate portion 21, formed integrally with the body portion 20, depends therefrom and is pivotally mounted by a rod 22 to upstanding ears 23 of a bracket 24 which is secured, as by welding, to an elongated, generally rectangular, rigid base 26. The base may be secured to a rigid foundation or to the base of the engine.

A cylindrical roller 30 is mounted in the bracket 17, being provided with a central drive shaft 31 one end of which is rotatably mounted in an anti-friction bearing assembly 33 disposed in an opening 34 in the end flange 19 of the bracket 17. The other end of the shaft 31 is rotatably mounted in an anti-friction bearing assembly 36 disposed in an opening 37 of the support plate 12. Thus the roller 30, which has an outer surface portion 35 of frictional material such as rubber, is disposed for rotation about an axis parallel to the shaft 40 of the electric motor 10.

The friction roller 30 is positively driven from the electric motor 10 through a gear 42 keyed to the shaft 40 of the motor and a gear 43 which is in mesh with the gear 42 and keyed to the shaft 31 of the friction roller.

The unitary mounting, including the support plate 12, the electric motor 10 and the friction roller 30, is moved toward and away from the periphery of the engine flywheel, indicated by F on Figure 1, by means of a lever system which includes a tubular, manually controlled lever 45 pivoted on a pin 46 to a vertical flange 47 secured to and projecting upwardly from the base 26. A stop pin 48 is secured to the flange 47 to limit the forward movement of lever 45. A composite link 49 is pivotally connected to the lower end of the lever 45 by a pin 50, and is provided at its opposite end with an eye 51. The eye 51 is pivotally mounted between spaced ears 52, projecting from the cradle-like body portion 20 of the bracket 17, by means of a pivot pin 54. The portion 55 of the composite link 49 which is pivotally attached to the lever 45 is of tubular form and receives the threaded shank 56 of the eye 51 in telescoped relation. This lower portion 55 is adjustably secured to the shank 56 by means of a nut 57 that is threaded on the shank and abuts the end of the tubular portion 55. The nut has a split sleeve 58 welded or clamped to it, the sleeve being disposed around the tubular portion 55. The sleeve is provided at its split section with opposed flanges 60 having aligned openings 62 adapted to receive a bolt for clamping the sleeve to the member 55, thus locking the threaded shank to the member 55.

From Figure 1 it will be obvious that counterclockwise movement of the manually controlled lever 45 will cause counterclockwise movement of the link 49 about the pin 46 and clockwise pivotal movement of the friction roller 30 toward the engine flywheel. Conversely, clockwise movement of the lever 45 will cause the friction roller 30 to be withdrawn from the engine flywheel.

Referring to Figure 1, it will be seen that the electric motor 10 is mounted on one side of a vertical plane through the center of the pin 22, while the axis of the friction roller 30 is on the other side of such a plane. Thus the weight of the motor will tend to pivot the unit counterclockwise about the pin 22 to a normal position with the friction roller retracted from the engine flywheel and with the lever 45 abutting the stop pin 48. However, since the roller, which may be a solid cylindrical member, tends to cause a clockwise movement about the pin 22, it will be evident that only a minimum amount of force must be exerted on the lever 45 to overcome the moment caused by the difference in weight of the motor and the roller and to pivot the friction roller into flywheel engagement.

The electric motor 10 is energized from a source of electric power (not shown) through a push button 65 mounted in the upper, open end of the tubular lever 45 and a solenoid switch 66 mounted on the motor or elsewhere.

It is to be noted that the pivotal connection 54 between the bracket 19 and the link 49 lies substantially on a straight line between the axis of the roller 30 and the pivot point 50. Thus, the force transmitted by the lever 49 is most efficiently applied to the roller for pivoting it.

From the foregoing description it will be seen that the application has provided a novel, efficient friction-type engine starter, particularly featuring an arrangement whereby the friction roller is always positively driven and thus always in position to turn the flywheel. The advantageous positioning of the motor and the friction roller on opposite sides of the axis about which the unit pivots provides a friction type starter that is more easily and quickly moved into flywheel engagement than was heretobefore possible.

In Figure 3 a modified friction-type engine starter is illustrated. In this arrangement two electric motors 70 and 71 are mounted on a support plate 73 by bolts 74. A friction roller 75, disposed between the motors, has a drive shaft 76 journalled in the plate 73 and in a flange 77 of a bracket 78 that is identical to the bracket 17 described in connection with Figure 1. A gear 80, keyed to the shaft 76 of the roller 75, is in mesh with a gear 81 keyed to the shaft of the electric motor 70 and with a gear 82 keyed to the shaft of the motor 71. Thus both motors drive the friction roller 75.

The unit, including the motors 70 and 71, the roller 75, the gears 81 and 82, and the plate 73, is pivotally mounted, through the bracket 78, on a pin 84. The pin 84 is supported in a bracket 85 which is secured to a rigid base 86. The unit is moved toward or away from the flywheel F' by means of a lever 87 that is pivoted at 88 on a flange 89 projecting upwardly from the base 86. A stop pin 90 may be mounted on the flange 89 to limit the movement of the lever 87.

An adjustable link 91, identical to the link 49 of Figure 1, is pivotally attached to the lever 87 at 93 and has an eye-end 94 pivotally attached to the bracket 78. Both of the motors may be energized from a source of electric power (not shown) through a push button 97 and a solenoid switch 98. This control system may be connected in the usual well-known manner.

The operation of this modified engine starter is substantially the same as the operation of the starter of Figure 1. However it is to be noted that this dual motor mounting supplies additional, positively applied power and is very efficient in starting large engines.

It will be understood that modifications and variations may be effected without departing from the scope of the novel concepts of the present invention.

We claim:

1. In a device for starting an internal combustion engine having a flywheel with an exposed rim, the combination of a base, a support plate pivotally mounted on said base, a roller rotatably mounted on said plate and having a friction surface for driving engagement with said flywheel rim, a motor mounted on said plate and in driving relationship with said roller, and said motor and roller being mounted on said plate in such positions thereon relative to each other and to the pivotal axis of the plate that the weight of said roller tends to pivot the plate in one direction while the weight of the motor tends to pivot the plate in the opposite direction.

2. In a device for starting an internal combustion engine having a flywheel with an exposed rim, the combination of a support plate, a bracket mounted on the plate and having a segmental cylindrical, cradle-like body portion with an upstanding end wall, spaced ears projecting from said body portion, and a plate member depending from said body portion and terminating in a lower free end, a base pivotally receiving said lower free end of said plate member, an adjustable linkage pivotally mounted on said base having one end pivotally disposed between said spaced ears, a rotatable roller journalled in said support plate and in the upstanding end wall of said bracket, said roller having a frictional peripheral surface movable into engagement with the rim of said flywheel, and an electric motor mounted on said support plate in driving relationship with said roller.

3. In a device for starting an internal combustion engine having a flywheel with an exposed rim, the combination of a base, a support plate pivotally mounted on said base, a roller rotatably mounted on said plate and having a friction surface movable against the rim of the flywheel upon pivotal movement of the plate in one direction, a motor mounted on said plate adjacent said roller, gear means interconnecting said roller and said motor, a tubular control lever pivotally mounted on said base, an adjustable link pivotally connected at one end to said control lever and at the other end to said support plate, and means for energizing said motor from a source of electric power including a push button mounted in said tubular lever and extending through the open end thereof.

4. A device for starting an internal combustion engine which has an exposed flywheel rim comprising a base, a bracket pivotally mounted on said base, a friction roller rotatably mounted on said bracket, a control lever having a pivotal connection on said base, an adjustable link pivotally mounted at one end on said lever and having a pivotal connection at the other end on said bracket, the pivotal connection between said bracket and said link lying substantially on a straight line between the axis of said roller and the pivotal connection at said one end of the link on said lever.

5. A device for starting an internal combustion engine which has a flywheel with an exposed rim, comprising a base, a support member pivotally mounted on said base, a friction roller journalled in said support member, motor means on said support member in positive driving connection with said friction roller, and a lever system in control of said support member and operative for pivotally positioning the support member to engage said roller in driving contact with the flywheel rim, said lever system including a member connected to said support member at a point thereof which in the lever effected position of the support member wherein the roller engages the flywheel rim, is located substantially on a diametral line through the axis of the roller and the point of roller contact with the flywheel rim.

6. A device for starting an internal combustion engine having a flywheel with an exposed rim comprising a base, a bracket pivotally mounted on said base, a plate secured in an upright position in said bracket, a pair of motors secured in spaced relation on said plate one on either side of a vertical plane through the pivot axis of said bracket, a friction roller rotatably mounted on said plate and movable bodily therewith into contact with the rim of the flywheel, gear means drivingly connecting each of said motors to said roller, and lever means operatively associated with said plate for moving said roller, said motors and said plate toward and away from the rim of said flywheel.

7. Starting means for an internal combustion engine having a flywheel, comprising a friction roller for flywheel driving engagement, roller drive means geared to the roller, pivotal support means for said roller and drive means, said drive means being located on said support means in a position relative to the pivotal axis of the support means such as to pivotally bias the support means in a direction to disengage the roller from the flywheel, lever means connected to said support means and operable to pivot the support means in the direction to position the friction roller in driving engagement with the flywheel, and stop means cooperable with said lever means for limiting pivotal bias displacement of said support means.

References Cited in the file of this patent

UNITED STATES PATENTS

| Number | Name | Date |
| --- | --- | --- |
| 455,530 | Furman | July 7, 1891 |
| 609,809 | Hollick | Aug. 30, 1898 |
| 787,462 | Myers | Apr. 18, 1905 |
| 1,248,776 | Adams | Dec. 4, 1917 |
| 1,377,018 | Maimin | May 3, 1921 |